United States Patent
Welschof

(10) Patent No.: US 6,793,583 B2
(45) Date of Patent: Sep. 21, 2004

(54) LONGITUDINAL PLUNGING UNIT

(75) Inventor: Hans-Heinrich Welschof, Rodenbach (DE)

(73) Assignee: GKN Lobro GmbH (DE)

( * ) Notice: Subject to any disclaimer, the term of this patent is extended or adjusted under 35 U.S.C. 154(b) by 94 days.

(21) Appl. No.: 10/184,262

(22) Filed: Jun. 26, 2002

(65) Prior Publication Data

US 2003/0008717 A1 Jan. 9, 2003

(30) Foreign Application Priority Data

Jul. 5, 2001 (DE) .......................................... 101 32 658

(51) Int. Cl.$^7$ ........................ F16C 3/035; F16D 3/224; F16D 3/06
(52) U.S. Cl. ........................ 464/167; 384/49; 464/145; 464/906
(58) Field of Search .......................... 384/49; 464/167, 464/168, 139, 143, 145, 146, 906, 185, 142

(56) References Cited

U.S. PATENT DOCUMENTS

| | | | | |
|---|---|---|---|---|
| 2,400,374 A | * | 5/1946 | Selnes .......................... 384/49 |
| 2,562,729 A | * | 7/1951 | Merwin ....................... 464/167 |
| 4,592,735 A | * | 6/1986 | Orain .......................... 464/111 |
| 4,981,459 A | * | 1/1991 | Klinkenberg ............... 464/167 |
| 5,624,318 A | * | 4/1997 | Jacob et al. ................. 464/140 |

FOREIGN PATENT DOCUMENTS

| DE | 199 52 245 A1 | 7/2000 |
|---|---|---|
| EP | 0 189 011 A2 | 7/1986 |

* cited by examiner

Primary Examiner—David Bagnell
Assistant Examiner—K. Thompson

(57) ABSTRACT

A longitudinal plunging unit for a shaft assembly used for torque transmitting purposes. The unit includes a profiled sleeve (11) with circumferentially distributed, longitudinally extending first ball grooves (12), a profiled journal (21) with circumferentially distributed, longitudinally extending second ball grooves (22), balls (31, 32, 33) which are arranged in groups of balls in pairs of first and second ball grooves (11, 21), and a ball cage (41) which is positioned between the profiled sleeve (11) and the profiled journal (21) and axially fixes the balls in their positions relative to one another, wherein in the region of the ball grooves (12, 22), the profiled sleeve (11) and the profiled journal (21) include the same torsional stiffness, such that, during the introduction of torque, they are subject to the same angles of torsion.

10 Claims, 3 Drawing Sheets

LONGITUDINAL PLUNGING UNIT

TECHNICAL FIELD

The present invention relates to a longitudinal plunging unit for a driveshaft assembly.

BACKGROUND OF THE INVENTION

The invention relates to a longitudinal plunging unit for a shaft assembly used for torque transmitting purposes. Such plunging units include a profiled sleeve with circumferentially distributed, longitudinally extending first ball grooves, a profiled journal with circumferentially distributed, longitudinally extending second ball grooves, balls which are arranged in groups of balls in pairs of first and second ball grooves, and a ball cage which is positioned between the profiled sleeve and the profiled journal and which axially fixes the balls in their positions relative to one another.

From DE 199 52 245 A1, there is known a longitudinal plunging unit or telescopic shaft of the foregoing type wherein hardness distortions are avoided in that the number of the first ball grooves corresponds to a multiple of the number of the second ball grooves and wherein the excess part of the first ball grooves remains free of balls.

EP 0 189 011 A proposes a further longitudinal plunging unit of the foregoing type for torque transmitting purposes. Freedom from play in the direction of rotation is achieved in that at least one ball or roller comprises an excess dimension relative to the grooves and includes a resilient material that is fitted under pretension.

When, under torque, the profiled sleeve is displaced relative to the profiled journal, the balls roll in the inner and outer ball grooves in a way which is substantially free of sliding friction. Thus, the balls and the ball cage with all its balls, cover half the relative displacement path between the two elements, and permit the change in length of the longitudinal plunging unit in a low-friction way. At the ends of the displacement path, axial stops for the ball cage or for the balls are provided in the profiled sleeve or on the profiled journal. Under normal operating conditions, the ball cage should, if possible, not reach the axial stops, but, in accordance with the specified design, it should be freely displaceable, thus avoiding any sliding friction of the balls in the grooves.

Assemblies of this type are used in torque transmitting shafts, such as driveshafts. They are used for the purpose of compensating for tolerances of the distance between the connecting parts during assembly and/or for compensating for changes in the distance between the connecting parts, such as joints. These assemblies require low-friction plunging conditions during operation. The basic design of such longitudinal plunging units is known. During operation, they are subject to a problem in that, during the specified transmission of torque, there necessarily occurs torsion at the inter-engaging portions of the profiled sleeve and of the profiled journal in the region of the ball grooves. As a result, within the groups of balls, the balls of the units positioned in the longitudinal direction at the ends are subjected to the highest loads due to the greatest differences in torsion occurring in those regions. In consequence, there can occur damage such as pittings. This damage occurs at the balls at the ends first, and is the starting point of the failure of the entire unit.

SUMMARY OF THE INVENTION

It is an object of the present invention to provide a longitudinal plunging unit of the foregoing type which has improved running behavior and, thus, a longer service life.

According to a first solution, in the region of the ball grooves, the profiled sleeve and the profiled journal comprise the same torsional stiffness, such that during the introduction of torque, they are subject to the same angles of torsion. In particular, in the region of the ball grooves, the profiled sleeve and the profiled journal comprise the same modulus of transverse elasticity (modulus of rigidity) of the material. They can be made of identical materials, while at the same time they can have the same polar inertia moment. This solution constitutes a first measure of reducing, under torque conditions, the torsional differences (angular errors) which, if viewed from the center, increase in the longitudinal direction between the torsion of the profiled sleeve and thus of the outer ball grooves, and the torsion of the profiled journal and thus of the inner ball grooves, in order to ensure that the loads to which the balls are subjected under torque are as uniform as possible.

A second solution is provided wherein, within the groups of balls, the size of the balls varies in the longitudinal direction. The balls positioned centrally in the longitudinal direction have the greatest diameter and the balls positioned at the ends have the smallest diameter. In particular, the size of the balls decreases linearly from ball to ball from the center outwardly. However, it is also contemplated to provide a sub-group of central balls which are identical in size and which are adjoined on both sides by smaller balls. The size of the balls is preferably such that in the torque-free condition of the longitudinal plunging unit, only the central balls are radially pretensioned between the profiled sleeve and the profiled journal. With this solution, it is assumed that, when under the influence of a torsional load, the profiled sleeve and the profiled journal are subjected to increasing torsion starting from their respective free ends. In such a case, the introduction of torque via the balls has not yet much of an effect to the respective connected ends, so that the torsional differences (angular errors) between the two parts are greatest at the respective connected ends which introduce the torque. To ensure that the balls are subjected to a uniform load, in accordance with the invention, the ball size is reduced from the center to the respective ends. Best uniform contact, i.e. uniform ball forces at all balls, should be provided at the torque occurring most frequently in the load spectrum.

The solutions detailed herein are based on theoretical equations which act as models for tortional behavior of the plunging unit. To that extent, it is particularly advantageous to combine the two solutions.

Two preferred embodiments of the invention are illustrated in the drawings and will be described below. Other advantages and features of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
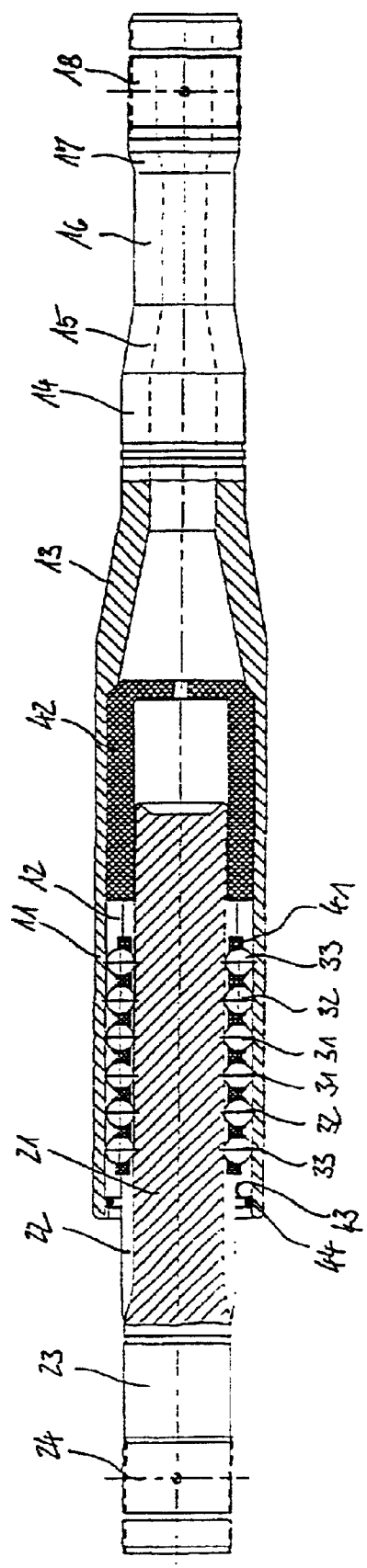
FIG. 1 is a longitudinal section through a longitudinal plunging unit for the transmission of torque according to a first embodiment of the present invention.

FIG. 1 shows a plunging unit with a profiled sleeve 11 having a constant cross-section which is axially followed by a first conical region 13, a first tubular region 14, a second conical region 15, a second tubular region 16, a third conical region 17 and a toothed sleeve 18. Into the profiled sleeve 11 there is inserted a profiled journal 21 with a constant cross-section which is formed by a solid journal and which is followed by a cylindrical journal 23 and a toothed journal 24. The profiled sleeve 11 comprises first outer ball grooves 12. The profiled journal 21 comprises second inner ball grooves 22 whose circumferential position corresponds to that of the outer ball grooves 12. However, the number of outer ball grooves 12 can be a multiple of the number of inner ball grooves 22. The ball grooves associated with one another carry sets of balls 31, 32, 33 which are held, so that they cannot be lost, by a sleeve-shaped ball cage 41 in a constant axial arrangement. More than one set of central balls 31 may be included. Likewise, more than one set of intermediate balls 32 and outer balls 33 may be included. Into the profiled sleeve 11, there is inserted a sleeve-shaped stop member 42 which engages the profile grooves in a formfitting and positive way and thus has a sealing effect relative to the tube end towards the right and, at the same time, forms an axial stop to prevent the profiled journal 21 from being inserted any further into the profiled sleeve 11. It also forms an axial stop for the ball cage 41. A further axial stop for the balls to prevent the ball cage 41 from being extracted from the profiled sleeve 11 is formed by a securing ring 44 inserted into an annular groove 43 in the profiled sleeve.

Figure 2:
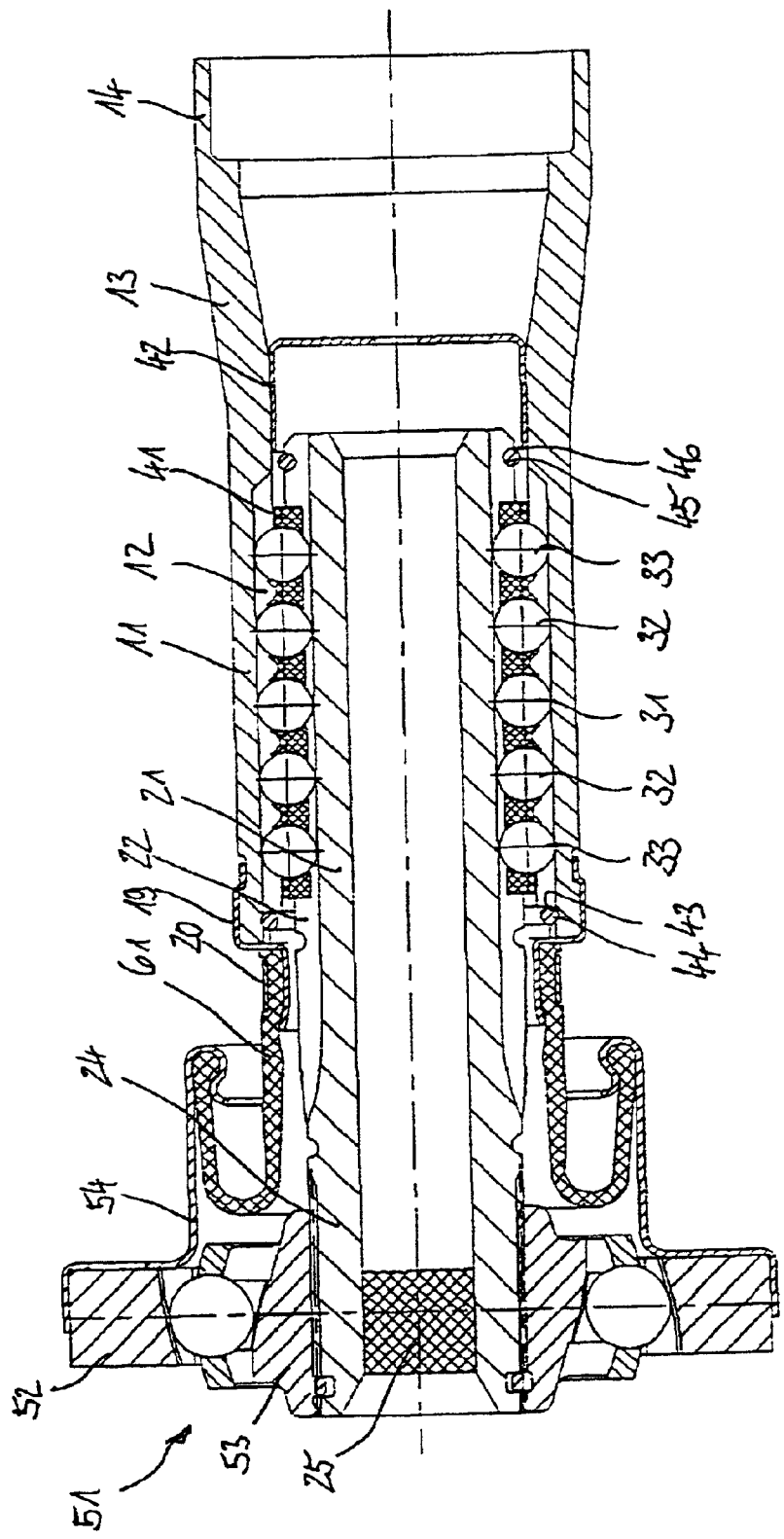
FIG. 2 is a longitudinal section through a longitudinal plunging unit according to a second embodiment combined with a constant velocity joint.

FIG. 2 shows a plunging unit having a profiled sleeve 11 with a constant cross-section which is axially followed by a conical region 13 and by a tubular region 14. Into the profiled sleeve 11 there is inserted a profiled journal 21 with a constant cross-section which is formed by a hollow journal and which is followed by a toothed journal 24. The profiled sleeve 11 comprises first outer ball grooves 12. The profiled journal 21 comprises second inner ball grooves 22 whose circumferential position corresponds to that of the outer ball grooves 12. However, the number of outer ball grooves 12 can be a multiple of the number of the inner ball grooves 22. Ball grooves which are associated with one another carry sets of balls 31, 32, 33 which are held, so that they cannot be lost, by a sleeve-shaped ball cage 41 in a constant axial arrangement. More than one set of central balls 31 may be included. Likewise, more than one set of intermediate balls 32 and outer balls 33 may be included. Into the profiled sleeve there is inserted a sleeve-shaped stop member 42 which has a sealing effect relative to the tube end towards the right and, at the same time, forms an axial stop to prevent the profiled journal 21 from being inserted any further into the profiled sleeve 11. A first axial stop for the ball cage 41 is formed by a securing ring 46 inserted into an annular groove 45 on the profiled journal 21. A further axial stop for the balls is formed by a securing ring 44 inserted into an annular groove 43 in the profiled sleeve. A constant velocity joint 51 is positioned on the toothed journal 24 by way of its inner joint part 53. The outer joint part 52 of the constant velocity joint 51 carries a sleeve 54 which clamps in a rolling boot 61. The other end of the rolling boot 61 is positioned on a sleeve 19 which, in turn, is arranged on the profiled sleeve 11 where it is secured by a clamp band 20. A plug 25 for containing the grease filling of the unit is inserted into the toothed journal 24.

In both of the arrangements shown in FIGS. 1 and 2, according to a first embodiment of the invention, in the region of the ball grooves 12, 22, the profiled sleeve 11 and the profiled journal 21 comprise the same torsional stiffness. Thus, they are subjected to the same angles of torsion when torque is introduced. According to a second embodiment of the invention, the central balls 31 have a greater diameter than the intermediate balls 32, and outer balls 33 positioned towards the ends. The ball grooves 12, 22 in both FIGS. 1 and 2 have a constant cross-section. When the longitudinal plunging unit is subjected to torsion, higher forces are applied to the intermediate balls 32 and outer balls 33 only after the profiled sleeve 11 and the profiled journal 21 begin to be subjected to torsion, so that over the expected average torque range all balls 31, 32, 33 are subjected to uniform Hertzian pressure relative to one another.

Figure 3:
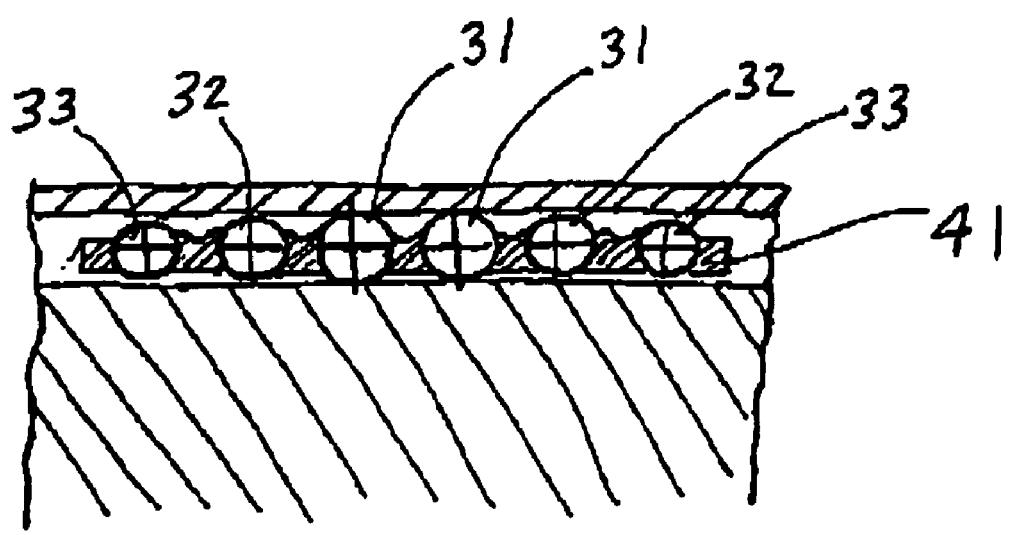
FIG. 3 shows a detail of the ball groups of FIG. 1.

FIG. 3 shows a detail of the ball groups of FIG. 1 wherein it can be seen, in exaggerated detail, that the central balls 31 have greater diameter than the intermediate bails 32 and the outer balls 33 positioned towards the end of the ball cage 41.

From the foregoing, it can be seen that there has been brought to the art a new and improved longitudinal plunging unit. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A longitudinal plunging unit for a shaft assembly used for torque transmitting purposes, comprising: a profiled sleeve with circumferentially distributed, longitudinally extending first ball grooves; a profiled journal with circumferentially distributed, longitudinally extending second ball grooves; balls which are arranged in groups of balls in pairs of first and second ball grooves; and a ball cage which is positioned between the profiled sleeve and the profiled journal and axially fixes the balls in their positions relative to one another, wherein, within the groups of balls, the size of the balls varies in the longitudinal direction such that the balls positioned centrally in the longitudinal direction comprise a greatest diameter and the bails positioned at ends comprise a smallest diameter.

2. A longitudinal plunging unit according to claim 1 wherein the size of the balls decreases linearly from ball to ball from the center outwardly.

3. A longitudinal plunging unit according to claim 1 wherein, in the torque-free condition, only the balls positioned centrally in the longitudinal direction are radially pre-tensioned in the pairs of first and second ball grooves.

4. A longitudinal plunging unit according to claim 2 wherein, in the torque-free condition, only the balls positioned centrally in the longitudinal direction are radially pre-tensioned in the pairs of first and second ball grooves.

5. A longitudinal plunging unit according to claim 1 wherein at an end of the profiled journal which projects from the profiled sleeve, there is arranged a constant velocity ball joint, and a convoluted or rolling boot is secured to an outer part of the constant velocity joint and to the profiled sleeve.

6. A longitudinal plunging unit according to claim 1 wherein, in the region of the first and second ball grooves, the profiled sleeve and the profiled journal comprise the same torsional stiffness, such that, during the introduction of torque, they are subject to a same angle of torsion.

7. A longitudinal plunging unit according to claim 2 wherein, in the region of the first and second ball grooves, the profiled sleeve and the profiled journal comprise the same torsional stiffness, such that, during the introduction of torque, they are subject to a same angle of torsion.

8. A longitudinal plunging unit according to claim 6 wherein, in the region of the first and second ball grooves, the profiled sleeve and the profiled journal comprise a same polar inertia moment and each comprise a material having a same modulus of transverse elasticity.

9. A longitudinal plunging unit according to claim 7 wherein, in the region of the first and second ball grooves, the profiled sleeve and the profiled journal comprise a same polar inertia moment and each comprise a material having a same modulus of transverse elasticity.

10. A longitudinal plunging unit according to claim 1 therein, in the region of the first and second ball grooves, the profiled sleeve and the profiled journal comprise a same polar inertia moment and each comprise a material having a same modulus of transverse elasticity.

* * * * *